United States Patent

[11] 3,614,473

[72] Inventors Donald S. Lindsay; William J. Little, both of Lynchburg, Va.

[21] Appl. No. 857,794
[22] Filed Sept. 15, 1969
[45] Patented Oct. 19, 1971
[73] Assignee General Electric Company

[54] IMPROVED CIRCUIT FOR PROVIDING TWO MONOSTABLE MULTIVIBRATORS
1 Claim, 3 Drawing Figs.

[52] U.S. Cl. ........ 307/273, 328/207
[51] Int. Cl. ........ H03k 3/284
[50] Field of Search ........ 307/273; 328/207

[56] References Cited

UNITED STATES PATENTS

| | | | |
|---|---|---|---|
| 2,430,725 | 11/1947 | Miller et al. | 328/207 X |
| 2,837,663 | 6/1958 | Walz | 307/273 |
| 2,933,625 | 4/1960 | Townsend et al. | 307/273 X |
| 3,017,524 | 1/1962 | Koletsky et al. | 307/273 X |
| 3,201,602 | 8/1965 | Norwalt | 328/207 X |
| 3,235,747 | 2/1966 | Pingry | 307/273 X |

*Primary Examiner*—Donald D. Forrer
*Assistant Examiner*—R. C. Woodbridge
*Attorneys*—James J. Williams, Frank L. Neuhauser, Oscar B. Waddell and Joseph B. Forman

ABSTRACT: Two monostable or one-shot multivibrators are provided by three transistors connected so that the first and second transistors form the first monostable multivibrator, and so that the second and third transistors form the second monostable multivibrator. A switching signal is applied to the first transistor to switch the first multivibrator. Switching of the first multivibrator switches the second multivibrator. Output signals can be derived from the third transistor. The first multivibrator preferably has a switched time longer than the switched time of the second multivibrator so that extraneous signals do not cause undesired switching.

INVENTORS:
DONALD S. LINDSAY,
WILLIAM J. LITTLE,
BY James J. Williams
THEIR ATTORNEY.

INVENTORS:
DONALD S. LINDSAY,
WILLIAM J. LITTLE,
BY James G. Williams
THEIR ATTORNEY

IMPROVED CIRCUIT FOR PROVIDING TWO MONOSTABLE MULTIVIBRATORS

BACKGROUND OF THE INVENTION

Our invention relates to a multivibrator, and particularly to a monostable or one-shot multivibrator.

Because of their relatively rapid operation and absence of moving parts, multivibrators are frequently used in situations requiring switching. Monostable or one-shot multivibrators are frequently used in situations requiring timed switching in response to an applied signal. There is, therefore, a need for improved monostable or one-shot multivibrators, particularly monostable or one-shot multivibrators that are relatively compact and economical, that are reliable, and that are relatively free from false operation (such as switching in response to an extraneous signal).

Accordingly, an object of our invention is to provide a new and improved multivibrator.

Another object of our invention is to provide a new and improved monostable multivibrator.

A more specific object of our invention is to provide a new and improved monostable multivibrator that is relatively compact, that provides relatively accurate switching, and that is relatively free from false operation.

SUMMARY OF THE INVENTION

Briefly, these and other objects are achieved in accordance with our invention by a multivibrator having three transistors. The first and second transistors are connected together to form a first monostable or one-shot multivibrator that has a first timed or switched period. The second and third transistors are connected together to form a second monostable or one-shot multivibrator that has a second timed or switched period preferably less than the first period. An applied signal causes the first multivibrator to switch from its stable state to its switched state. Switching of the first multivibrator causes the second multivibrator to switch from its stable state to its switched state. Output signals are derived from a second multivibrator which is protected in its second switched period by the longer first switched period, so that extraneous signals are not likely to produce false switching. Thus, our invention provides, in essence, all of the advantages of two monostable or one-shot multivibrators but requires only three transistors.

BRIEF DESCRIPTION OF THE DRAWING

The subject matter which we regard as our invention is particularly pointed out and distinctly claimed in the claims. The structure and operation of our invention, together with further objects and advantages, may be better understood from the following description give in connection with the accompanying drawing, in which:

DESCRIPTION OF THE PREFERRED EMBODIMENT

Figure 1:
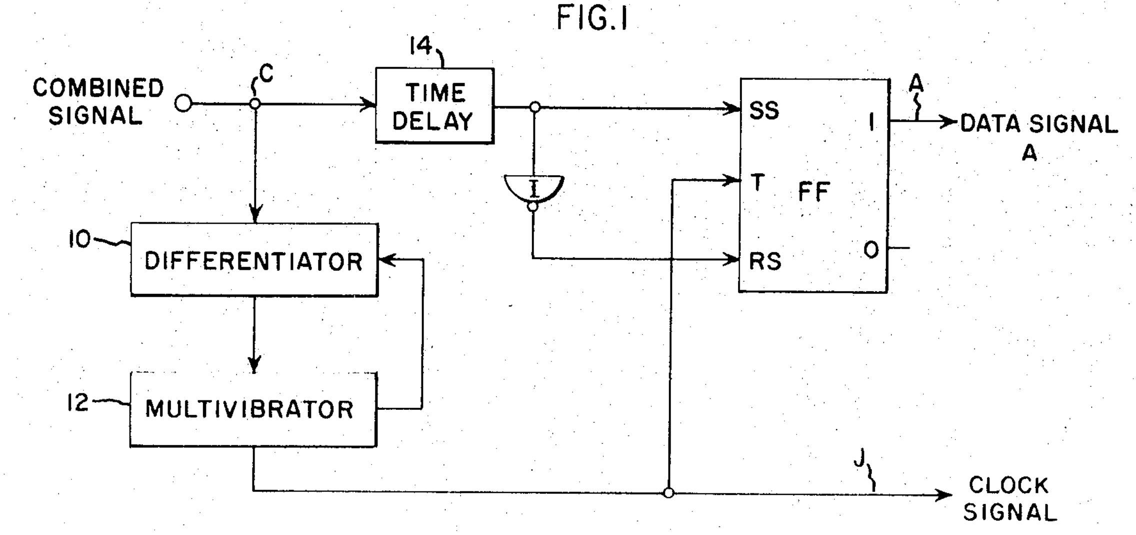
FIG. 1 shows a block diagram illustrating one application for our improved monostable multivibrator.

The application shown in FIG. 1 for our monostable multivibrator is illustrative only, and it is to be understood that our improved monostable multivibrator may be utilized in many different applications. The block diagram of FIG. 1 represents a system for handling combined signals which have both data signals and clock signals. The data signals carry the information or intelligence between selected locations, and the clock signals provide the necessary synchronization of the parts of the system provide the necessary synchronization of the parts of the system between or at the two locations. FIG. 3A shows a data signal, FIG. 3B shows a clock signal, and FIG. 3C shows a combined signal. In FIG. 1, the combined signal is applied at C to a differentiator circuit 10 which provides appropriate pulses at the leading and trailing edges of the combined signal pulses, and supplies the differentiated signal to a multivibrator 12 in accordance with our invention. The multivibrator 12 operates on the differentiated signal and produces a clock signal at its output J. These same clock signals are also applied to a trigger input T of a conventional bistable flip-flop FF along with the combined signals. The combined signals are given an appropriate time delay by a time-delay circuit 14, and are applied to a set steering input SS of the flip-flop FF. The combined signals are also inverted by an inverter I and applied to a reset steering input RS of the flip-flop FF. The flip-flop FF is a known logic device which has an output 1 and an output 0. When the flip-flop FF is set, the output 1 produces a logic 1 and the output 0 produces a logic 0. When the flip-flop FF is reset, the output 1 produces a logic 0 and the output 0 produces a logic 1. The condition of the flip-flop is determined or controlled by an appropriate logic signal applied to one of the two steering inputs SS, RS, followed by an appropriate trigger signal applied to the trigger input T. If the flip-flop FF has set steering and is then triggered, it will become set; if the flip-flop FF has reset steering and is triggered, it will then become reset. The data signal is derived from the output terminal 1 of the flip-flop FF at A, and can be utilized in any way desired. The restored or derived clock signal is derived at J, and can be utilized to provide the necessary system synchronization. Again, it is to be emphasized that the application of our multivibrator 12 shown in FIG. 1 is illustrative only. Persons skilled in the art will appreciate that our multivibrator 12 may be utilized in many different systems, applications, and devices, and may be used for many different functions or purposes.

Figure 2:
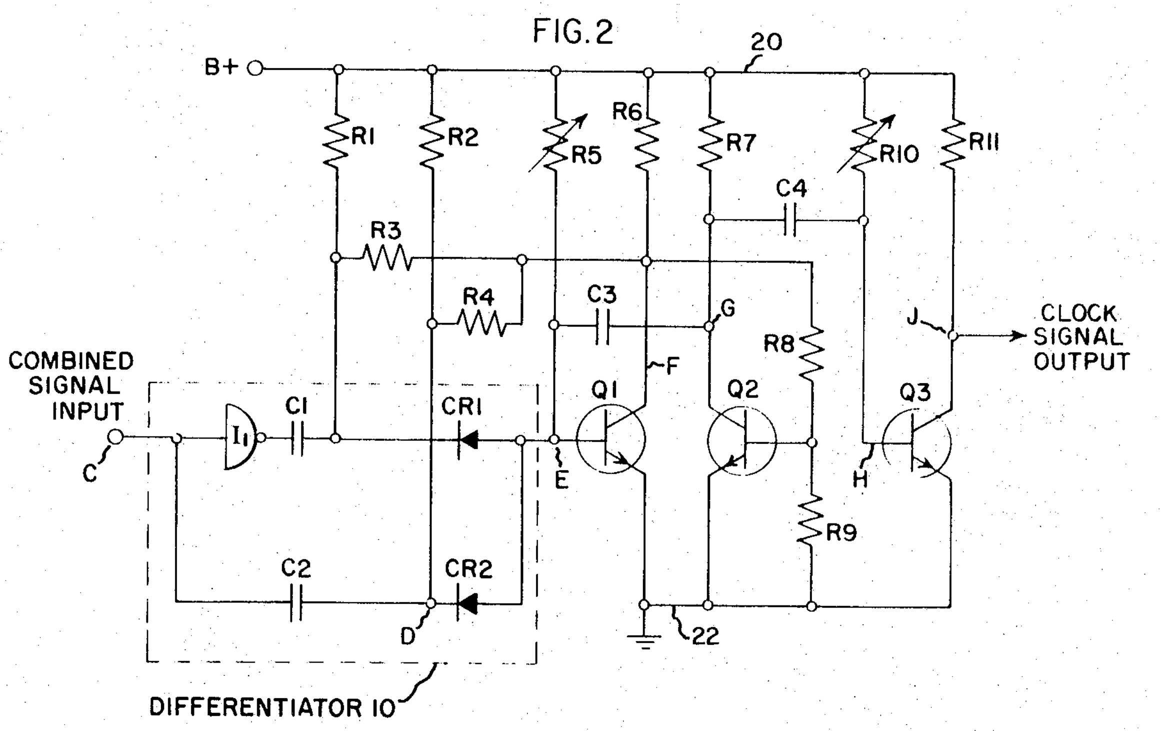
FIG. 2 shows a schematic diagram of a preferred embodiment of a monostable multivibrator in accordance with our invention.

With reference to FIG. 2, we have shown the differentiator 10, since it is helpful in understanding the operation of our multivibrator. The differentiator 10 receives the combined signal at C, and inverts this signal in an inverter I1. The inverted signal and the normal signal are applied to capacitors C1, C2, respectively, and are rectified by rectifiers CR1, CR2, respectively. The two differentiated and rectified signals are then applied to our multivibrator at the base of an NPN-type transistor Q1. Power for the multivibrator is supplied by a suitable source of direct current potential B+, which is connected to a power supply bus 20. The negative terminal of the power supply B+ may be connected to a point of reference potential, such as the ground bus 22. Positive voltage for the differentiator 10 is supplied by two resistors R1, R2, which are connected between the bus 20 and the capacitors C1, C2, respectively. The transistor Q1 is normally biased in a conducting or on condition, and is connected to an NPN-type transistor Q2 to form a first monostable multivibrator. This connection includes a direct current impedance or resistance R8 connected from the collector of the transistor Q1 to the base of the transistor Q2. A timing circuit is provided by a capacitor C3 connected between the collector of the transistor Q2 and the base of the transistor Q1, and by a variable resistor R5 connected between the base of the transistor Q1 and the positive bus 20. Suitable operating potentials for the transistors Q1, Q2 are supplied by two resistors R6, R7 respectively connected from the bus 20 to the collectors of the transistors Q1, Q2. Two resistors R3, R4 are respectively connected from the collector of the transistor Q1 to the capacitors C1, C2 for the purpose of providing further protection or isolation from extraneous signals. A resistor R9 is connected between the base and emitter of the transistor Q2 to bias the transistor Q2 in a normally nonconducting or off condition.

The second multivibrator comprises the transistor Q2 and an NPN-type transistor Q3. This multivibrator comprises a resistor R11, which supplies operating potential to the collector of the transistor Q3. A timing circuit is provided by a capacitor C4 connected between the collector of the transistor Q2 and the base of the transistor Q3, and by a variable resistor R10 connected between the bus 20 and the base of the transistor Q3. An output is derived at the collector of the transistor Q3.

Figure 3:
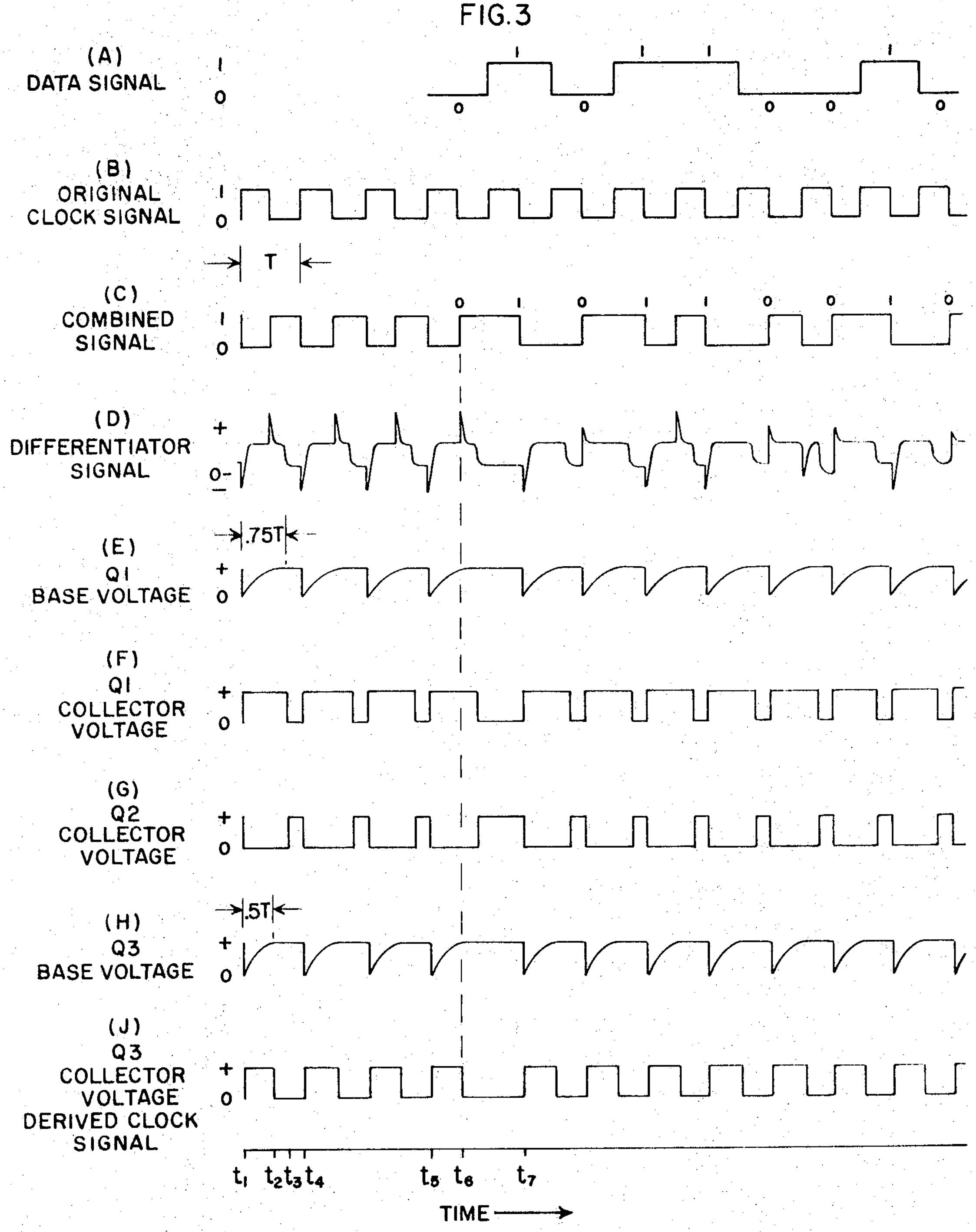
FIG. 3 shows waveforms illustrating the operation of our monostable multivibrator shown in FIG. 2.

Operation of the multivibrator shown in FIG. 2 will be explained in connection with the waveforms shown in FIG. 3. The waveforms are plotted along a common time axis. The waveform designations C through J in FIG. 3 correspond to the location designations C through J in FIG. 2 at which the waveforms respectively appear. Before explaining this operation, however, it will be helpful to explain a typical data signal and how it is combined with a clock signal to produce a combined signal. FIG. 3A shows a typical data signal which varies at any selected rate between a logic 0 and a logic 1 to provide the desired information or intelligence. FIG. 3B shows a typical clock signal which varies at a constant rate between a logic 0 and a logic 1 to provide timing or synchronization. One complete cycle of the clock signal occurs between the times $t_1$ and $t_4$. The data signal and the clock signal can be combined by known logic AND gates to provide the combined signal shown in FIG. 3C. In the absence of a data signal, a clock signal is utilized to provide an idling condition which is represented by the combined signal between the times $t_1$ and $t_5$. At the time $t_5$, the data signal is introduced. In the operation being explained, the data signal is assumed to begin with a logic 0. The data signal and the clock signal produce the combined signal which represents the logic 0 by the transition from a logic 1 to a logic 0 at the time $t_5$. When the data signal changes to a logic 1, this is represented by the combined signal as a transition from a logic 1 to a logic 0 as shown at the time $t_7$. As mentioned earlier, the clock signal has a complete cycle between the times $t_1$ and $t_4$, and this is represented by the time interval T. This time interval T is supposed to be constant, since the clock signal is used for timing and synchronization.

With this background explanation, the operation of the multivibrator of FIG. 2 will be explained in connection with the waveform shown in FIGS. 3. The combined signs of FIG. 3C supplied to the differentiator 10 is differentiated and rectified directly, and is also inverted and differentiated and rectified. Thus, at the point D (the cathode of the rectifier CR2), a differentiated signal is produced at each leading and trailing edge, as shown in FIG. 3D. The signal at the cathode of the rectifier CR1 is similar to the signal of FIG. 3D, but is inverted. The transistor Q1 is biased in a normally on or conducting condition, so that when a differentiated signal is received at the time $t_1$, the base voltage of the transistor Q1 goes from some positive value toward 0 as shown in FIG. 3E at the time $t_1$. This turns the transistor Q1 off so that the collector voltage goes toward a positive value as shown in FIG. 3F at the time $t_1$. With the base voltage at a low value, the capacitor C3 begins to charge as shown in the FIG. 3E. However, the time constant of the capacitor C3 and the resistor R5 is arranged to be less than the time period T, for example 0.75 T, so that an extraneous noise signal up until the time $t_3$ cannot cause further switching of the multivibrator. With the collector voltage of the transistor Q1 positive, as shown at the time $t_1$ in FIG. 3F, this voltage is supplied through the resistor R8 to the base of the transistor Q2 to turn the transistor Q2 on. The collector voltage of the transistor Q2 goes toward 0 as shown in FIG. 3G at the time $t_1$. This voltage is coupled through the capacitor C4 to the base of the transistor Q3, so that the base voltage of the transistor Q3 goes toward zero as shown in FIG. 3H at the time $t_1$. The collector voltage of the transistor Q3 goes toward a positive value as shown in FIG. 3J at the time $t_1$. The time constant for the capacitor C4 and the resistor R10 is made less than the time constant for the capacitor C3 and the resistor R5, for example 0.5 T. This time constant is chosen so as to reproduce the clock signal shown in FIG. 3B. Hence, the base voltage of the transistor Q3 reaches a positive voltage at approximately the time $t_2$, so that the transistor Q3 is turned on again. The collector voltage of the transistor Q3 goes toward zero, as shown by the waveform in FIG. 3J at the time $t_2$. At the time $t_3$, the base voltage of the transistor Q1 approaches the necessary positive voltage so that the transistor Q1 is turned on again. This causes the transistor Q2 to be turned off, as indicated in the waveform in FIG. 3G at the time $t_3$, so that the circuit or multivibrator is restored to its initial condition. At the time $t_4$, another differentiator signal is received and is effective (because the base voltage of the transistor Q1 is now positive), and the cycle just described repeats itself.

Thus, it will be seen that our multivibrator provides, in effect, two monostable multivibrators but only requires three transistors. Further, our multivibrator protects itself or is protected against switching by selecting a time constant for the first multivibrator (comprising the transistors Q1 and Q2) which is greater than the time constant for the second multivibrator (comprising the transistors Q2 and Q3). The multivibrator, as described, can operate from any type of differentiated signal. At the time $t_5$, when the data signal is introduces, it will be noticed that the multivibrator is responding to the wrong edge or the wrong one of the differentiator signals. However, the multivibrator operation is delayed at the time $t_6$, so that subsequent to that time $t_6$, it operates on the proper differentiator signal. The clock signal is derived at the collector of the transistor Q3; and from FIG. 3J, it will be seen that it faithfully reproduces the original clock signal of FIG. 3B. This faithful reproduction results partially from the fact that the timing period of the second multivibrator can be accurately set and maintained at one half the period of the clock signal (i.e., at 0.5 T).

The circuit shown in FIG. 2 was constructed and operated with circuit components having the following values:

| Component | Value |
|---|---|
| Resistor R1 | 20,000 ohms |
| Resistor R2 | 20,000 ohms |
| Resistor R3 | 10,000 ohms |
| Resistor R4 | 10,000 ohms |
| Resistor R5 | Variable from 30,000 to 40,000 ohms |
| Resistor R6 | 2,000 ohms |
| Resistor R7 | 1,000 ohms |
| Resistor R8 | 20,000 ohms |
| Resistor R9 | 20,000 ohms |
| Resistor R10 | Variable from 30,000 to 40,000 ohms |
| Resistor R11 | 2,000 ohms |
| Capacitor C1 | 470 micromicrofarads |
| Capacitor C2 | 470 micromicrofarads |
| Capacitor C3 | 3,400 microfarads to 13,600 microfarads |
| Capacitor C4 | 1,950 microfarads to 7,800 microfarads |
| Rectifiers CR1,CR2 | Type 19A115250 |
| Transistors Q1, Q2, Q3 | Type 19A115552 |
| Voltage | +12 volts |

This circuit gave satisfactory and reliable operation over timing periods T which varied between 50 and 200 microseconds.

While we have shown only one embodiment of our invention, persons skilled in the art will appreciate that modifications may be made For example, other devices, such as vacuum tubes, can be used in place of the transistors Q1, Q2, Q3. Similarly, PNP-type transistors can be used if appropriate voltage polarities are observed. Various timing periods may be provided. And finally, positive-going differentiator signals can be utilized if appropriate voltage polarities are observed.

Therefore, while the invention has been described with reference to a particular embodiment, it is to be understood that modifications may be made without departing from the spirit of the invention or from the scope of the claims.

What we claim as new and desire to secure by letters patent of the United States is:

1. An improved multivibrator comprising:
a. a first transistor having an emitter, a base, and a collector;
b. a second transistor having an emitter, a base, and a collector;
c. a third transistor having an emitter, a base, and a collector;

d. means connected to said first transistor to normally place said first transistor in a conducting state;

e. input means connected to said base of said first transistor to place said first transistor in a nonconducting state in response to a received signal;

f. direct current impedance means connected between the emitter-collector path of said first transistor and said base of said second transistor to cause said second transistor to change conducting states in response to said first transistor changing conducting states;

g. first timing means connected between the emitter-collector path of said second transistor and said base of said first transistor to place said first transistor in said conducting state after a first selected time interval following said second transistor being placed in said conducting state;

h. means connected to said third transistor to normally place said third transistor in a conducting state;

i. and second timing means connected between the emitter-collector path of said second transistor and said base of said third transistor to place said third transistor in a nonconducting state for a second selected time interval in response to said second transistor being placed in said conducting state, said first selected time interval being greater than said second selected time interval.

PO-1050
(5/69)

UNITED STATES PATENT OFFICE
CERTIFICATE OF CORRECTION

Patent No. 3,614,473 Dated October 19, 1971

Inventor(s) Donald S. Lindsay and William J. Little

It is certified that error appears in the above-identified patent and that said Letters Patent are hereby corrected as shown below:

Column 1, lines 73-74 - Cancel "provide the necessary synchronization of the parts of the system".

Column 3, line 35 - Change "signs" to -- signal -- .

Column 4, line 16 - Change "introduces" to -- introduced -- .

Signed and sealed this 30th day of May 1972.

(SEAL)
Attest:

EDWARD M.FLETCHER,JR.
Attesting Officer

ROBERT GOTTSCHALK
Commissioner of Patents